United States Patent
Wolff et al.

(10) Patent No.: US 9,357,698 B2
(45) Date of Patent: Jun. 7, 2016

(54) CUTTING MACHINE WITH IMPROVED CINEMATICS

(71) Applicant: KUHN S.A., Saverne (FR)

(72) Inventors: Michel Wolff, Waltenheim sur Zorn (FR); Michael Schwer, Bourscheid (FR)

(73) Assignee: KUHN S.A., Saverne (FR)

( * ) Notice: Subject to any disclaimer, the term of this patent is extended or adjusted under 35 U.S.C. 154(b) by 0 days.

(21) Appl. No.: 14/409,175

(22) PCT Filed: Jul. 9, 2013

(86) PCT No.: PCT/FR2013/051639
§ 371 (c)(1),
(2) Date: Dec. 18, 2014

(87) PCT Pub. No.: WO2014/009652
PCT Pub. Date: Jan. 16, 2014

(65) Prior Publication Data
US 2015/0189831 A1 Jul. 9, 2015

(30) Foreign Application Priority Data
Jul. 12, 2012 (FR) ...................................... 12 56707

(51) Int. Cl.
*A01D 34/00* (2006.01)
*A01D 34/66* (2006.01)
*A01D 34/86* (2006.01)

(52) U.S. Cl.
CPC ............ *A01D 34/661* (2013.01); *A01D 34/866* (2013.01)

(58) Field of Classification Search
CPC ... A01D 34/661; A01D 75/185; A01D 34/28; A01D 34/66; A01B 73/02; A01B 61/04; A01B 63/10

USPC .................................................... 56/15.2, 228
See application file for complete search history.

(56) References Cited

U.S. PATENT DOCUMENTS 4,974,399 A * 12/1990 Haberkorn ............. A01B 73/02
56/15.2
5,101,616 A * 4/1992 Wolff ................... A01D 34/661
56/10.1
(Continued)

FOREIGN PATENT DOCUMENTS

EP          1 060 650 A1    12/2000
EP          1 527 669 A1     5/2005
(Continued)

OTHER PUBLICATIONS

International Search Report issued Oct. 16, 2013, in PCT/FR2013/051639, filed Jul. 9, 2013.

*Primary Examiner* — Árpád Fábián-Kovács
(74) *Attorney, Agent, or Firm* — Oblon, McClelland, Maier & Neustadt, L.L.P.

(57) ABSTRACT

A cutting machine with a chassis including a frame and a coupling support configured to be mounted on a three-point hitch of a tractor, and with an arm connected directly to the frame by a first articulation and extending, at least during work, laterally relative to the frame, the arm carrying a work element and configured, by a displacement device, to be pivoted relative to the frame between a work position, a maneuver position, and a transport position. The displacement device includes a connecting-rod and at least a first jack articulated between the frame and the connecting-rod and a second jack articulated to the arm and connected to the connecting-rod by a pin. The connecting-rod is directly connected to the arm by a second articulation, and the second articulation is separate from the first articulation.

20 Claims, 7 Drawing Sheets

(56) References Cited

U.S. PATENT DOCUMENTS

| | | | | |
|---|---|---|---|---|
| 5,241,809 A * | 9/1993 | Wolff | A01B 73/042 56/16.2 |
| 5,353,579 A * | 10/1994 | Wolff | A01B 61/04 56/15.2 |
| 5,353,580 A * | 10/1994 | Wolff | A01D 34/661 56/15.2 |
| 5,566,537 A * | 10/1996 | Kieffer | A01D 75/185 56/15.2 |
| 5,727,371 A * | 3/1998 | Kieffer | A01D 34/661 56/10.2 R |
| 5,839,261 A * | 11/1998 | Haberkorn | A01D 34/661 56/15.2 |
| 5,857,314 A * | 1/1999 | Wolff | A01D 34/661 56/15.8 |
| 5,896,733 A * | 4/1999 | Neuerburg | A01D 34/661 56/15.2 |
| 5,934,050 A * | 8/1999 | Neuerburg | A01D 34/661 56/15.2 |
| 6,125,619 A * | 10/2000 | Wolff | A01D 34/662 56/14.9 |
| 6,311,464 B1 | 11/2001 | Neuerburg et al. | |
| 6,349,529 B1 * | 2/2002 | Neuerburg | A01D 34/661 56/14.9 |
| 7,055,300 B2 * | 6/2006 | Wolff | A01D 34/661 56/6 |
| 7,380,391 B2 * | 6/2008 | Kieffer | A01B 63/10 280/414.5 |
| 7,523,601 B2 * | 4/2009 | Wolff | A01D 34/661 56/228 |

FOREIGN PATENT DOCUMENTS

| | | |
|---|---|---|
| EP | 2 248 408 A2 | 11/2010 |
| FR | 2 759 851 A1 | 8/1998 |
| FR | 2 964 007 A1 | 3/2012 |
| NL | 1033509 | 9/2008 |

* cited by examiner

CUTTING MACHINE WITH IMPROVED CINEMATICS

The present invention relates to a cutting machine, in particular for plants, with a chassis comprising a frame and a coupling support designed to be mounted on a three-point hitch of a tractor, and with an arm connected directly to the frame by a first articulation and extending, at least during work, laterally relative to the frame, the arm carrying a work element and being able, using a displacement device, to be pivoted relative to the frame between a work position, a maneuver position and a transport position, the displacement device comprising a connecting-rod and at least a first jack articulated between the frame and the connecting-rod and a second jack articulated to the arm and connected to the connecting-rod using a pin, the arm being displaceable relative to the connecting-rod by actuation of the second jack.

On a machine of this type known from document EP 1 527 669 A1, the arm is carried by the frame, in an articulated manner, by means of the first articulation. The connecting-rod is also carried by the frame, in an articulated manner, by means of an articulation whereof the pivoting axis is, in a preferred alternative embodiment of this machine, coincident with that of the first articulation. The displacement of the work element from the work position to the transport position is obtained by pivoting the arm around the first articulation with the frame. This pivoting can be broken down into two movements. During a first movement, carried out by the first jack arranged between the frame and the connecting-rod, the connecting-rod pivots relative to the frame. While pivoting, the connecting-rod drives the arm in a pivoting movement relative to the frame, because the connecting-rod and the arm are connected by the second jack, which acts as a tie-rod. During a second movement, the second jack, located between the arm and the connecting-rod, is actuated so as to move the arm relative to the connecting-rod and therefore so as to move the arm further relative to the frame. Actuation of the second jack has no impact on the position of the connecting-rod relative to the frame, since that position is determined by the first jack. In this second movement, the assembly formed by the frame, the connecting-rod and the first jack forms an articulated triangle made rigid by the fact that the first jack behaves like a tie-rod.

A drawback of the known machine is that the actuation of the second jack makes it possible only to move the arm relative to the connecting-rod, but not also the connecting-rod relative to the frame. Consequently, at least one of the jacks must have a significant length to ensure sufficient pivoting of the work element between the work position and the transport position, in particular when the latter is situated beyond the vertical. In an embodiment of the known machine, the first jack is used for the passage from the maneuver position to the transport position, during which the pivoting angle of the arm is significant, while the second jack is used for displacement from the work position to the maneuver position, during which the pivoting angle of the arm is small. The second jack has a reduced length, which requires the first jack to have a significant length. This increases the bulk, mass and cost of the displacement device.

A second cutting machine is known from document NL 1 033 509 C2. On this machine, a connecting-rod extending laterally relative to the frame is carried by the latter, in an articulated manner, by means of two superposed bars forming an articulated parallelogram. A first articulated jack between the connecting-rod and the frame makes it possible to deform and move that articulated parallelogram so as to translate the connecting-rod vertically relative to the frame. This connecting-rod in turn carries an arm by means of an axis around which the arm can pivot through the action of a second jack articulated between the connecting-rod and the arm. That arm carries a work element. A drawback of this arrangement is that the pivoting of the work element between the work position and the transport position is completely assigned to the second jack, the first jack only vertically translating the work element relative to the frame. The total travel and length of the second jack are consequently significant, which increases the bulk, mass and cost thereof. Furthermore, the construction using an articulated parallelogram is complex and expensive. The many articulations that it comprises are a source of failures and operating play.

The present invention aims to propose a cutting machine that does not have the aforementioned drawbacks. It proposes a simple and compact displacement device making it possible to lighten the machine and reduce its cost. This displacement device comprises a reduced number of articulations, which is favorable to the lifetime of the machine. It also allows a high ground clearance of the machine for maneuvers and transport, and allows the work element to be raised at a good distance from the ground for maneuvers and, if necessary, to be pivoted well beyond the vertical for a reduced transport height.

To that end, an important feature of the invention consists of the fact that the connecting-rod is directly connected to the arm by a second articulation, and the second articulation is separate from the first articulation. In this way, the second jack, by change of its length, simultaneously moves the arm, the connecting-rod and the first jack relative to the frame. The coupling support has a median plane and the arm comprises an end distant from the first articulation, which end carries the work element. Advantageously, the second jack, by change of its length, on the one hand moves the end with respect to the pin in a direction relative to the median plane, and on the other hand the pin with respect to the median plane in the same direction. A reduced travel requested for the second jack to move the arm relative to the frame is thus obtained. In the example where the second jack causes the arm to pivot from the maneuver position to the transport position, that pivoting being of large amplitude, the second jack may keep a reduced length. The first jack used to move the arm, with a smaller amplitude, from the work position to the maneuver position also keeps a reduced length.

Other features and advantages of the invention will emerge from the description below in reference to the appended drawings, which show, as non-limiting examples, several example embodiments of the coupling device according to the invention.

In the following description, the notions of "above", "below", "lower" and "upper" are defined relative to the ground, and the notions of "front", "back", "downstream", "left" and "right" are defined relative to the direction of advance (A).

Figure 1:
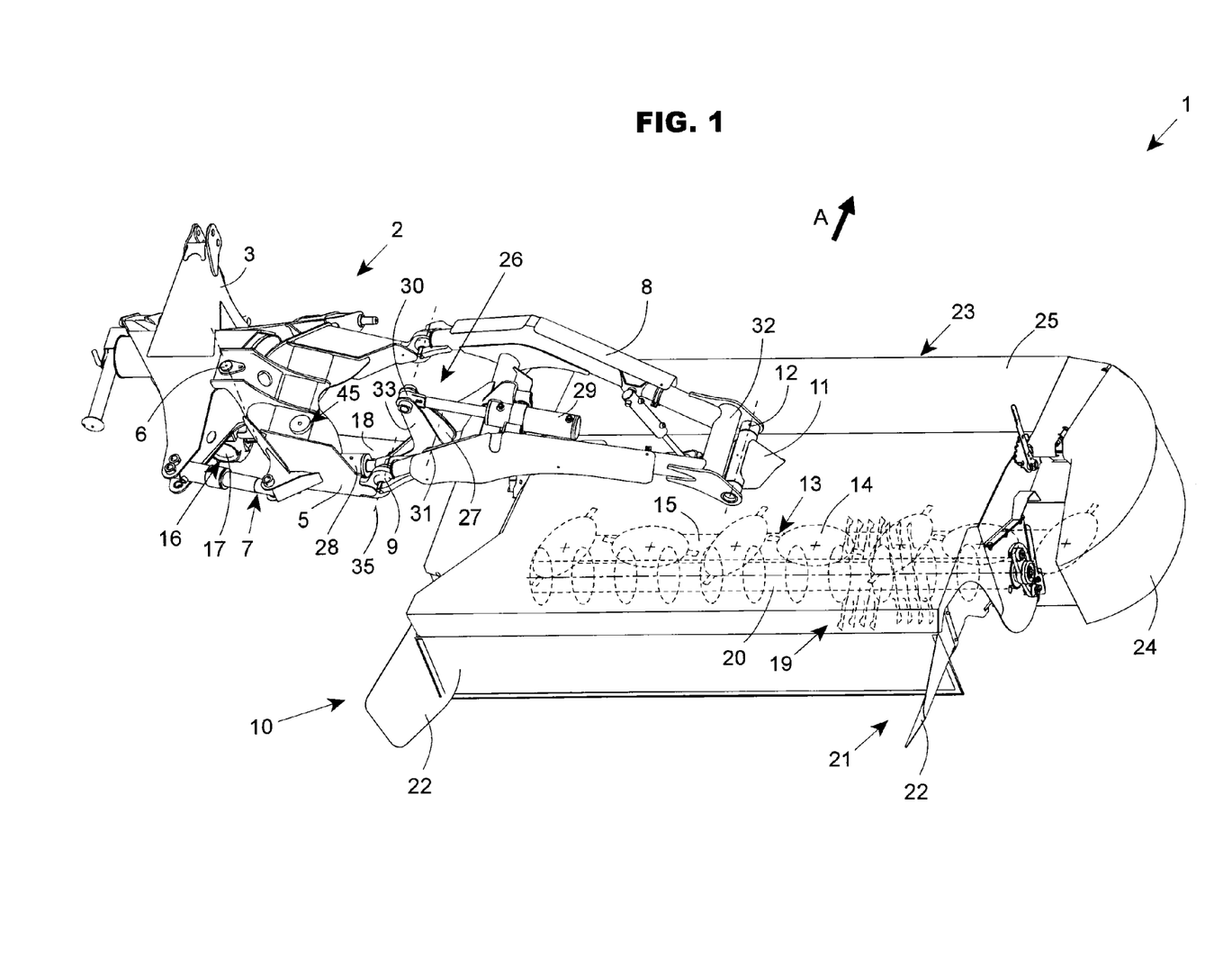
FIG. 1 shows a perspective view of a first alternative embodiment of a cutting machine according to the invention.

As shown in FIG. 1, the cutting machine (1) according to the invention comprises a chassis (2). The chassis (2) in particular comprises a coupling support (3) that can be mounted on a three-point hitch of a tractor (4) shown only partially in FIG. 2. The coupling support (3) for example has the form of a machine-welded structure. In its lower part, it comprises two pins designed to catch on the lower coupling arms of the tractor (4). In its upper part, it comprises one or more holes that can each receive an axis for connection to an upper coupling rod of the tractor (4). The chassis (2) also comprises a frame (5). The frame (5) can be connected in a rigid or articulated manner to the coupling support (3). In the figures, the frame (5) is connected to the coupling support (3) using a substantially vertical axis (6), but which could also be inclined toward the front or the back. Additionally, restraining means (7) for retaining the frame (5) relative to the coupling support (3) are provided, these means (7) in particular comprising a jack articulated to the frame (5) and the coupling support (3) and arranged behind said axis (6). During work, these restraining means (7) keep the frame (5) in a position where it extends substantially perpendicular to the direction of advance (A). In the event the machine (1) encounters an obstacle, these restraining means (7) allow the frame (5) to pivot backward in a limited and damped manner.

The machine (1) comprises an arm (8) directly connected to the frame (5) by a first articulation (9) and extending, at least during work, laterally relative to the frame (5). "Directly" means that the connection between the arm (8) and the frame (5) is formed by an articulation of the axis or ball joint type. The arm (8) is carried by the frame (5), in an articulated manner, by means of the first articulation (9). The arm (8) carries a work element (10) in a rigid or articulated manner. The arm (8) is for example made in a single piece. To that end, as only articulations, it comprises the first articulation (9) with the frame and the possible articulation with the work element (10). The arm (8) is a rigid assembly.

The work element (10) comprises an intermediate frame (11). In the case of a rigid connection between the arm (8) and the work element (10), the arm (8) may be visually integrated into the outer casing of the work element (10), without necessarily being arranged at some distance above the work element (10). In that case, the arm (8) is somewhat coincident with the intermediate frame (11). Alternatively, the work element (10) may be articulated to the arm (8). That articulated connection can comprise one or more degrees of rotational freedom. In the figures, the intermediate frame (11) is articulated to the arm (8) by means of an axis (12) extending in the direction of advance (A).

The work element (10) comprises cutting elements (13) for example formed by cutting rotors (14) such as discs or drums provided with blades that extend beyond the periphery of the rotors (14). The latter are mounted on bearings arranged at more or less regular intervals on a cutterbar (15) connected to the intermediate frame, and are, during operation, driven in quick rotation by means of a train of gears incorporated into a sealed casing containing a lubricant such as oil. By being driven in rotation, the blades then cut the plants rising above the ground, such as grass or other forage plants. The casing of the cutterbar (15) has the form of an elongated parallelepiped. The train of gears is actuated by transmission means (16) able to transmit the necessary power from the tractor (4), these transmission means (16) in particular comprising a transmission casing, a gear casing (17) and one or more articulated transmission elements (18). In the figures, the transmission casing is situated on the left flank of the cutterbar (15). The transmission casing for example contains one or more gears, chains or belts mechanically connected to the cutting elements (13). The gear casing (17) is situated below the chassis (2). It is rigidly connected to the chassis (2). It would nevertheless be conceivable for the gear casing (17) to be articulated to the chassis (2) and that its movements be controlled for example by a lever connected to the frame (5) or the arm (8). A first articulated transmission element (18) has the form of a shaft carrying, at each end, a universal joint connected to the gear casing (17) and the transmission casing, respectively. A second articulated transmission element, not shown in the figures, has the form of a shaft carrying at one end a universal joint connected to the gear casing (17) and the other end a quick connecting means to the power take-off of the tractor (4). The transmission means (16) could also comprise a hydraulic or electric motor. The work element (10) can also comprise conditioning elements (19) for the cut plants arranged downstream from the cutterbar (15). These conditioning elements (19) are carried by the intermediate frame (11). They for example comprise one or more conditioning rotors (20) carrying fingers or flails, only part of which is shown in FIG. 1. The conditioning elements (19) additionally comprise a metal sheet and a comb that are arranged above said rotor(s) and that cooperate with these fingers or flails. This metal sheet and/or this comb are optionally adjustable so as to modify the intensity of the conditioning. The conditioning elements (19) could also be formed by rollers comprising a raised design on their surface, for example a chevron design. The work element (10) may also comprise windrowing elements (21), such as swath shields (22) or windrowing drums arranged at the lateral ends of the cutterbar (15) or conditioning elements (19). The windrowing elements (21) could also be formed by one or more augers or conveyor belts arranged perpendicular to the direction of advance (A). As shown in FIG. 1, the intermediate frame (11) carries swath shields (22) that make it possible to orient the flow of cut plants laterally and backward. The windrowing elements (21) could also be carried by a support articulated to the intermediate frame (11), so as to be able to be moved between an active position and an inactive position. Lastly, the work element (10) can comprise a protection element (23). The latter at least partially surrounds the cutterbar (15) and possible conditioning (19) and/or windrowing (21) elements previously described. The protection element (23) for example comprises a flexible cloth (24) that extends vertically so as to form the front, left and right faces of the protection element (23). This flexible cloth (24) is assembled, on its upper perimeter, to a hood (25) forming the upper face of the protection element (23). This hood (25) is made up of one or more metal sheets assembled together and may comprise portions made from a synthetic material. The hood (25) is connected to the intermediate frame (11) and may comprise foldable parts.

It remains conceivable for the chassis (2) carries an alternative cutterbar, which includes two rows of cutting fingers arranged above one another and driven in an alternating movement relative to one another. The cutting elements (13) could also be formed by one or more grinding rotors arranged vertically or horizontally. Such grinding rotors are for example provided with blades, flails or hammers.

The different articulations of the machine (1) may, in a known manner, be formed by axes and/or ball joints.

Figure 2:
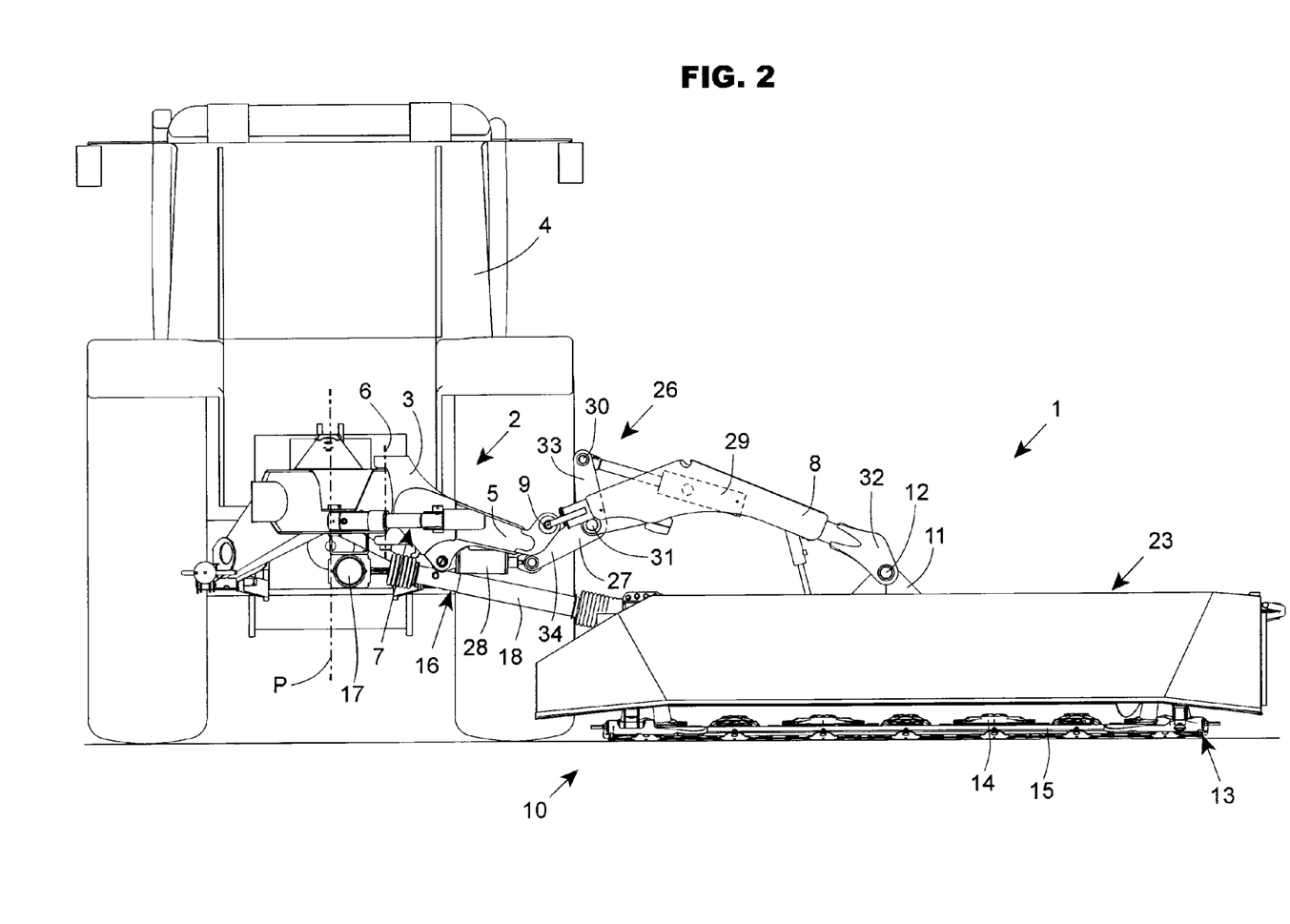
FIG. 2 shows a rear view of the first alternative embodiment, in work position.
Figure 3:
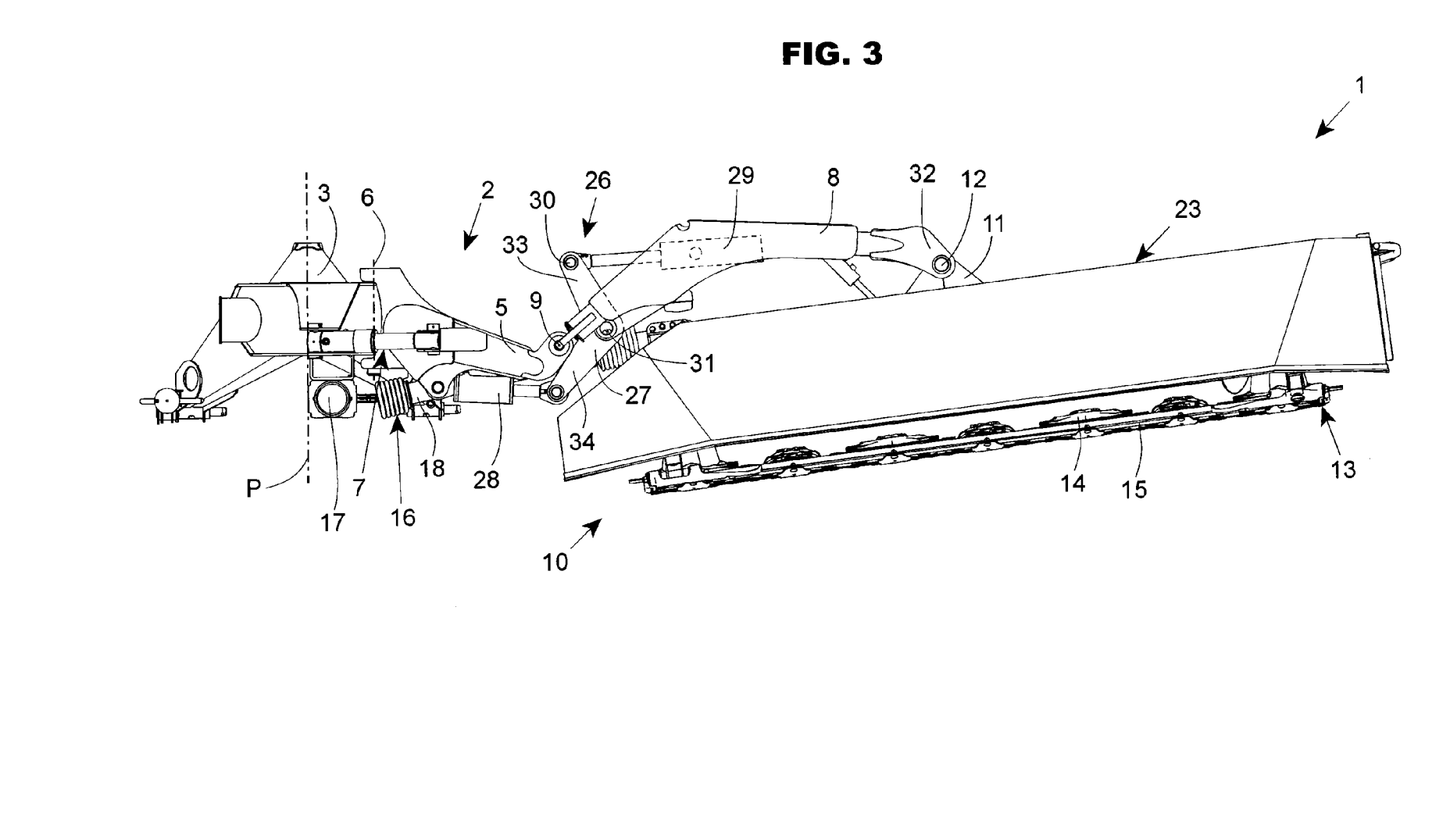
FIG. 3 shows a rear view of the first alternative embodiment, in maneuver position.
Figure 4:
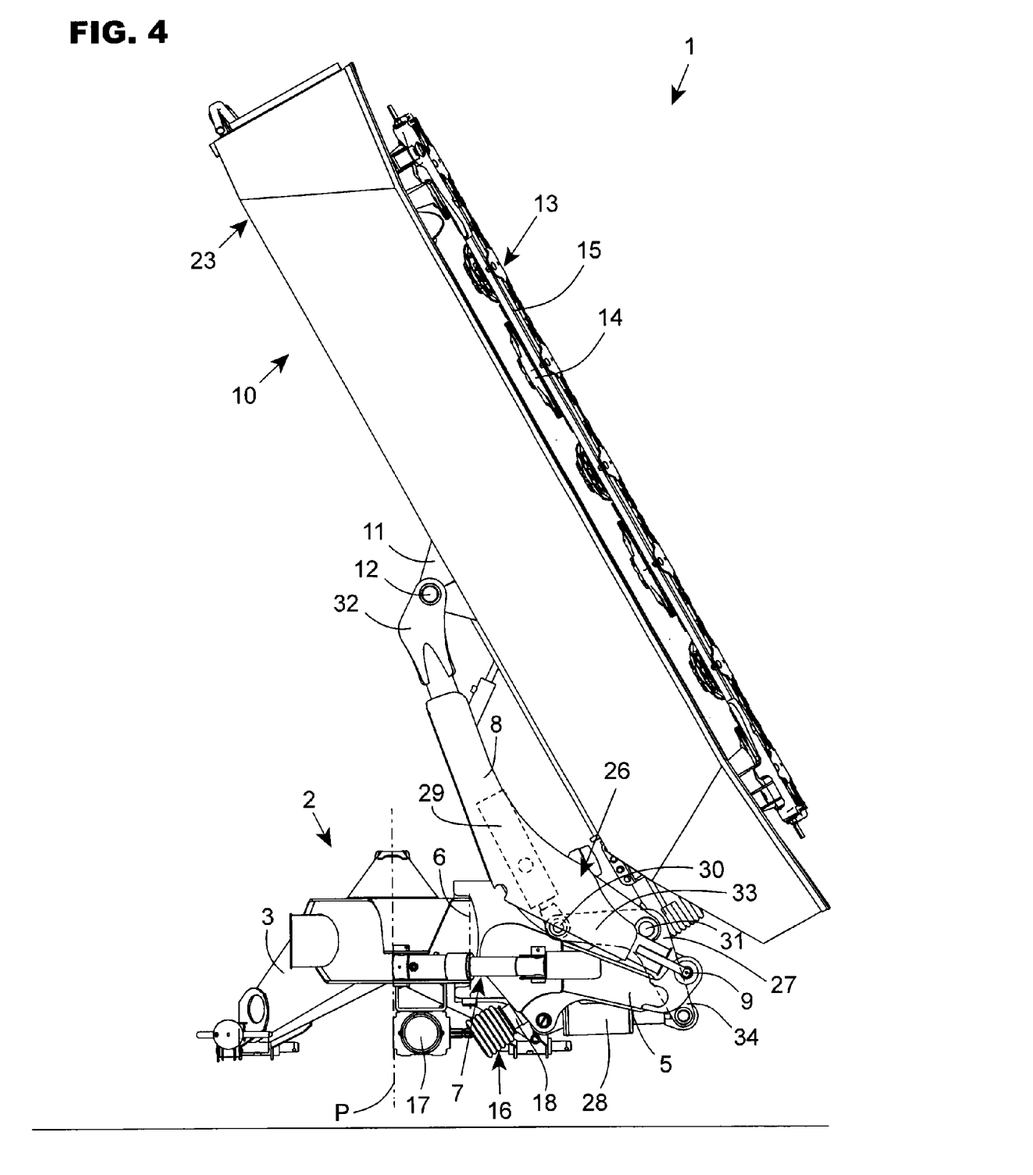
FIG. 4 shows a rear view of the first alternative embodiment, in a transport position beyond the vertical.
Figure 5:
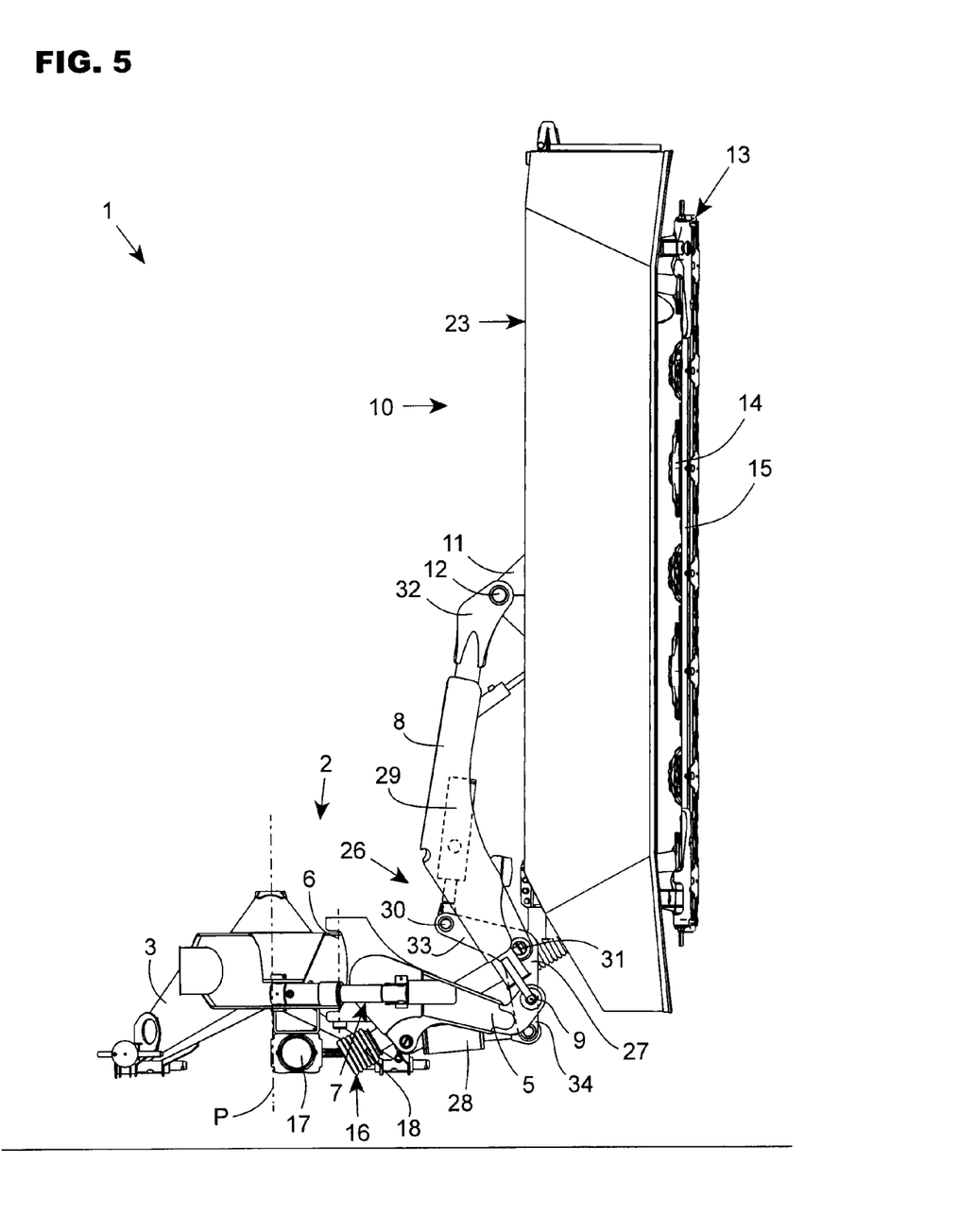
FIG. 5 shows a rear view of the first alternative embodiment, in a substantially vertical transport position.

The arm (8) can be pivoted relative to the frame (5) between a work position, shown in FIG. 2, in which the work element (10) rests on the ground, a maneuver position, illustrated in FIG. 3, in which the work element (10) is raised at some distance from the ground to pass over obstacles or plants that have already been worked, and a transport position, for example shown in FIG. 4, in which the work element (10) is maximally raised for easy transport of the machine (1) on open road or from one parcel to another. In FIG. 4, one can see that the work element (10) is folded from the horizontal by an angle greater than 90°. Such an arrangement is advantageous when the work element (10) has a significant working width, because a transport height below the legal limit remains possible. Alternatively, as shown in FIG. 5, the work element (10) may also extend substantially vertically in the transport position. Such an arrangement may be preferred when the working width of the work element (10) is reduced.

The arm (8) is pivoted relative to the frame (5) between the positions previously described by means of the displacement device (26). The latter in particular comprises a connecting-rod (27). As for example shown in FIG. 2, the connecting-rod (27) is a separate element from the arm (8). The displacement device (26) also comprises at least one first jack (28) articulated between the frame (5) and the connecting-rod (27), as well as a second jack (29) articulated to the arm (8) and connected to the connecting-rod (27) by means of a pin (30).

According to an important feature of the invention, the connecting-rod (27) is directly connected to the arm (8) by a second articulation (31). "Directly" means that the connection between the connecting-rod (27) and the arm (8) is formed by an articulation of the axis or ball joint type. The connecting-rod (27) is supported by the arm (8) at the second articulation (31). As a result, a displacement of the arm (8) around the first articulation (9) drives a displacement of the connecting-rod (27) with it. The second articulation (31) is separate from the first articulation (9). This means that the respective geometric pivoting axes or points of these first and second articulations (9 and 31) are separate. In particular, and as for example emerges from FIG. 2, two vertical planes oriented substantially parallel to the direction of advance (A) and each passing, at least in the work position, through a respective geometric pivoting axis or point of said articulations (9 and 31), are remote from each other.

When the first jack (28) is actuated, it moves the connecting-rod (27) relative to the frame (5). In its movement, the connecting-rod (27) causes the arm (8) to pivot around the first articulation (9) with the frame (5). When the second jack (29) is actuated, it moves the arm (8) relative to the connecting-rod (27). In the case at hand, a relative pivoting of the arm (8) and the connecting-rod (27) around the second rigid articulation (31) takes place. Given that the connecting-rod (27) bears on the first jack (28) and that the arm (8) is carried by the frame (5) by means of the first articulation (9), the second jack (29) simultaneously moves the arm (8), the connecting-rod (27) and the first jack (28) relative to the frame (5).

The coupling support (3) has a median plane (P). In the figures, this median plane (P) extends substantially vertically and parallel to the direction of advance (A). The arm (8) comprises an end (32) remote from the first articulation (9), which end (32) carries the work element (10). In the example embodiment of the figures, that end (32) carries the axis (12) with the work element (10). The displacement device (26) is preferably designed so that the actuation of the second jack (29) on the one hand modifies a first distance between the end (32) and the pin (30), by a first amount, and on the other hand modifies a second distance between the pin (30) and the median plane (P), by a second amount of the same sign as the first amount. The second distance is measured perpendicularly to the median plane (P). The first and second amounts have a positive or negative sign. For example, during a transposition of the work element (10) from the work position to the transport position, the actuation of the second jack (29) brings the end (32) of the pin (30) closer to the pin (30) of the median plane (P). In this case, the first, respectively the second distance is reduced by a first, respectively a second amount, those amounts being positive.

The machine (1) according to the invention provides that at least one of the first and second jacks (28, 29) moves the work element (10) between the work position and the maneuver position. At least the other of the first and second jacks (28, 29) moves the work element (10) between the maneuver position and the transport position. It would therefore be conceivable for the displacements of the work element (10) between any of the work, maneuvering and transport positions to be obtained by separate or combined displacements of the first and second jacks (28, 29).

In the alternative embodiments of the figures, the first jack (28) moves the work element (10) between the work position and the maneuver position, while the second jack (29) moves the work element (10) between the maneuver position and the transport position.

In the first alternative embodiment of FIGS. 1 to 5, the first jack (28) is a single-acting jack actuated in elongation. As shown in FIG. 4, the second jack (29) may be double-acting, in particular when the work element (10) in transport position is pivoted beyond a vertical position. The second jack (29) actuated to shortening then moves the work element (10) toward the transport position and, actuated in elongation, moves the work element (10) from the transport position. Alternatively, as illustrated in FIG. 5, the second jack (29) may be single acting, in particular when the work element (10) in transport position extends substantially vertically. The second jack (29) is then actuated to shortening.

In the first alternative embodiment of FIGS. 1 to 5, the elongation of the first jack (28) causes, in rear view of the machine (1), a pivoting movement of the connecting-rod (27) upward and toward the median plane (P). At the same time, the second jack (29) is not actuated and therefore behaves like a tie-rod with a fixed length. The movement of the connecting-rod (27) is therefore transmitted to the arm (8), which is made to pivot around the first articulation (9), causing the work element (10) to be lifted off the ground toward its maneuver position. This position is reached after the arm (8) has pivoted by moderate angle; the first jack (28) can then have a reduced travel and length. The second jack (29) is next actuated to shortening. The end of the arm (8) remote from the first articulation (9) than comes closer to the pin (30). At the same time, the first jack (28) keeps the length that it reached in the maneuver position, and acts as a rigid tie-rod. Through reaction of the connecting-rod (27) on the first jack (28), the pin (30) comes closer to the median plane (P). The different displacements continue until the second jack (29) has reached a length that corresponds to the transport position of the machine (1). Thus, the displacement of the arm (8) from the maneuver position to the transport position is obtained by combining shortening of the second jack (29) and bringing the pin (30)—carrying the second jack (29)—closer toward the position that the arm (8) takes in the transport position. This feature allows the use of a second jack (29) with a reduced travel, and therefore reduced length. The displacement device (26) in its entirety is therefore relatively compact, in particular in a direction perpendicular to the direction of advance (A). This feature allows the work element (10) to come considerably closer to the arm (8) in the maneuver position, as shown by FIG. 3, resulting in a more significant clearance above the ground. FIGS. 4 and 5 also show that the displacement device (26) has a reduced vertical bulk in the transport position. This feature on the one hand allows significant pivoting of the arm (8) beyond the vertical, resulting in a reduced height of the machine (1) for transport, and on the other hand results in a high ground clearance. It will thus be noted that during transport, the jacks (28, 29), the arm (8) and the connecting-rod (27) extend above the lowest point of the frame (5).

The displacement device (26) is preferably designed so that at least in the work position, the first articulation (9) is arranged between the median plane (P) and the second articulation (31). In other words, in rear view of the machine (1), the second articulation (31) is located to the right of the first articulation (9). According to another embodiment, not shown, the arm (8) could comprise a part extending to the left of the first articulation (9), and the displacement device (26) would then be designed so that said part carries the second articulation (31).

In the first alternative embodiment of FIGS. 1 to 5, the connecting-rod (27) is divided into an upper portion (33) situated above the second articulation (31), which upper portion (33) carries the pin (30), and into a lower portion (34) situated below the second articulation (31), which lower portion (34) is articulated to the first jack (28). This arrangement advantageously makes it possible to use part of the available space below the first articulation (9), to house the first jack (28) therein, which frees up significant space above the first articulation (9) to allow pivoting of the arm (8) with a considerable amplitude, for example beyond the vertical.

Figure 6:
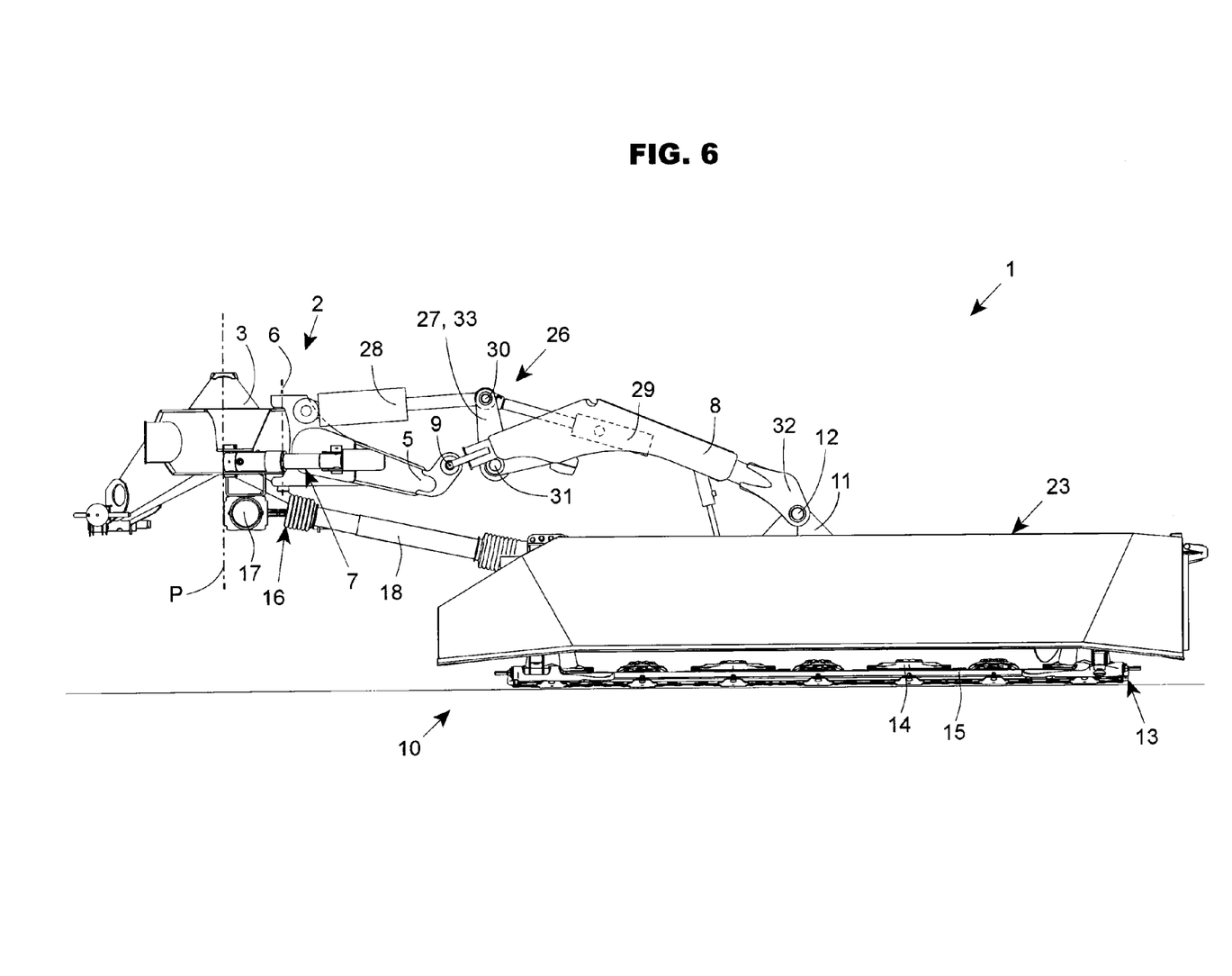
FIG. 6 shows a rear view of a second alternative embodiment, in work position.

In the second alternative embodiment of FIG. 6, the connecting-rod (27) comprises an upper portion (33) situated above the second articulation (31), which upper portion (33) carries the pin (30) and is articulated to the first jack (28). In that case, the first jack (28) therefore at least partially extends above the first articulation (9). This configuration may be preferred to the first to increase the ground clearance in the maneuvering and/or transport positions, or to shelter the first jack (28) from fodder projections.

In these two alternative embodiments, the first jack (29) extends, at least partially, above the arm (8). A significant space below the arm (8) is therefore preserved to allow the work element (10) to come considerably closer thereto in the maneuver position, in order to achieve significant ground clearance.

Advantageously, in at least one of the work and maneuver positions, the first jack (28) and the second jack (29) overlap. This means that, in rear view of the machine (1), the two jacks (28, 29) are at least partially superposed. This feature provides remarkable compactness to the displacement device (26) in a direction perpendicular to the direction of advance (A).

In the figures, the first articulation (9) has a pivoting axis (35) situated in a vertical plane parallel to the direction of advance (A) of the tractor (4). Thus, in the work position, the arm (8) extends substantially perpendicular to the direction of advance (A). Said pivoting axis (35) can be oriented in the direction of advance (A), in which case the arm (8) moves in a vertical plane between the work position and the transport position. Alternatively, said pivoting axis (35) may be inclined toward the front, such that in the transport position, the center of gravity of the machine (1) is closer to the tractor (4). Said pivoting axis (35) can also be inclined toward the back, for example to allow a work element (10) with large dimensions to be folded upward without colliding with the tractor (4).

Figure 7:
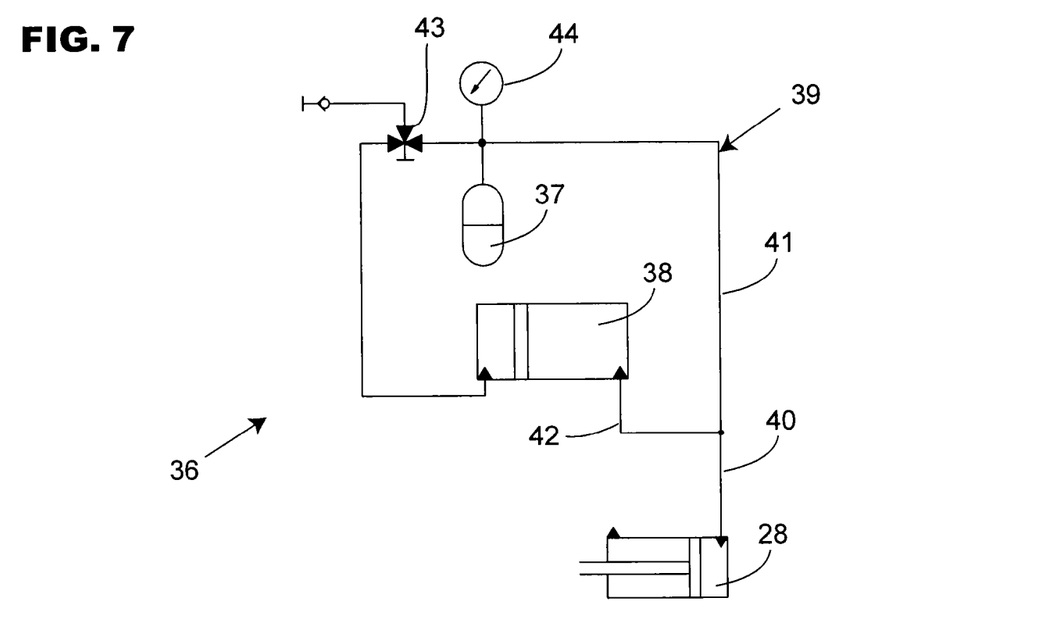
FIG. 7 diagrammatically shows a control circuit of the first jack.

According to an advantageous feature of the invention, a control circuit (36) of the first jack (28) comprises an accumulator (37) and a lifting pump (38). Thus, the first jack (28) can simultaneously carry out the lightening of the work element (10) and the displacement device (26) during work, and the damping of the displacement of the work element (10) during work and around the maneuver position. During work, the aim of the lightening is to limit the pressure that the work element (10) exerts on the ground when it moves. The work element (10) is thus prevented from scraping the ground too much or becoming too embedded therein, which preserves it from excessive wear and limits the advance resistance of the machine (1). The lightening also avoids introducing too many impurities—dirt, stones—into the worked plants. The damping prevents the work element (10) from bouncing on obstacles during work. The damping also makes it possible to brake possible displacements of the work element (10) around the maneuver position, for example when the tractor (4) travels over uneven terrain. As shown in FIG. 7, the control circuit (36) of the first jack (28) comprises a fluid circulation system (39) connecting the first jack (28), the accumulator (37) and the lifting pump (38) to each other. The accumulator (37) comprises a sphere whereof the inner volume is separated into two chambers by a flexible membrane, one chamber containing a pressurized gas such as nitrogen, the other chamber containing oil. The lifting pump (38) has the form of a barrel in which a piston can slide. The piston thus delimits two chambers of adjustable volume. The circuit (39) comprises a duct (40) which divides into a first branch (41) and a second branch (42). The first jack (28), which is preferably single-acting, is supplied with oil by the duct (40) and the first branch (41) is connected to a three-way valve (43). This first branch (41) carries the accumulator (37) as well as a pressure gauge (44). The second branch (42) is connected to a chamber of the lifting pump (38), the other chamber of the lifting pump (38) being connected to the three-way valve (43). The three-way valve (43) is connected to a hydraulic distributor, not shown, for the supply of oil from the tractor (4). In order to move the work element (10), the three-way valve (43) is oriented so as to allow the oil to flow between the distributor and the lifting pump (38) only. A position of the distributor then makes it possible to send oil into the lifting pump (38), the piston of which translates and moves a predetermined volume of oil toward the jack (28). This causes the work element (10) to pivot upward. Another position of the distributor makes it possible to return the oil from the lifting pump (38) to a reservoir, and the work element (10) lowers under its own weight. The three-way valve (43) can be oriented so as to allow the oil to flow between the distributor and the first branch (41) only. By acting on the distributor, oil can then be sent into the first branch (41). Due to the orientation of the three-way valve (43), the piston of the lifting pump (38) remains immobile, resulting in increased pressure in the accumulator (37) and in the first jack (28), and therefore increased lightening. The length of the first jack (28) varies following vertical movements of the work element (10) that take place during work, and optionally around the maneuver position. In that case, the first jack (28) moves a relatively small volume of fluid, since its length and travel are reduced. The damping can therefore keep a substantially constant value with an accumulator (37) of a reasonable size, which is an additional advantage imparted by the overall compactness of the displacement device (26) according to the invention.

Advantageously, a stop means (45) is provided on the chassis (2). In the example embodiments in the figures, this stop means (45) is placed on the frame (2), but it could also be arranged on the coupling support (3). In the transport position shown in FIGS. 4 and 5, the upper portion (33) of the connecting-rod (27) bears on the stop means (45), for example near the pin (30). To that end, the stop means (45) for example comprises a rubber buffer. In the alternative embodiment of FIG. 4, which provides a transport position beyond the vertical, the maintenance in the position of the connecting-rod (27) on the stop means (45) is provided by the inherent weight of the displacement device (26) and the work element (10). In the alternative embodiment of FIG. 5, which provides a substantially vertical transport position, it is preferable for the stop means (45) to additionally comprise a locking means, not shown. The latter for example comprises a hook articulated to the chassis (2) and, in the transport position, attaching to an axis rigidly fastened to the connecting-rod (27) or the arm (8). Nevertheless, the use of such a locking means would also be conceivable in the alternative embodiment of FIG. 4.

It is quite clear that the invention is not limited to the alternative embodiments described above and shown in the appended figures. Changes remain possible, in particular regarding the composition or number of the various elements or by substituting technical equivalents, without going beyond the scope of protection.

The invention claimed is:

1. A cutting machine, or a cutting machine for plants, with a chassis, comprising:
    a frame and a coupling support configured to be mounted on a three-point hitch of a tractor;
    a displacement device; and
    an arm connected directly to the frame by a first articulation and extending, at least during work, laterally relative to the frame, the arm carrying a work element and configured, by the displacement device, to be pivoted relative to the frame between a work position, a maneuver position, and a transport position,
    wherein the displacement device includes a connecting-rod and at least a first jack articulated between the frame and the connecting-rod, and a second jack articulated to the arm and connected to the connecting-rod by a pin, the arm being movable relative to the connecting-rod by actuation of the second jack;
    wherein the connecting-rod is directly connected to the arm by a second articulation, and the second articulation is distinct from the first articulation.

2. A cutting machine according to claim 1, wherein the connecting-rod is separate from the arm.

3. A cutting machine according to claim 1, wherein the connecting-rod is carried by the arm at the second articulation.

4. A cutting machine according to claim 1, wherein the arm, the connecting-rod, and the first jack are, relative to the frame, simultaneously moved by the second jack.

5. A cutting machine according to claim 4, wherein the coupling support has a median plane, the arm comprises an end remote from the first articulation, which end carries the work element, and the actuation of the second jack modifies a first distance between the end and the pin, by a first amount, and modifies a second distance between the pin and the median plane, by a second amount, the second amount having a same sign as the first amount.

6. A cutting machine according to claim 5, wherein at least in the work position, the first articulation is arranged between the median plane and the second articulation.

7. A cutting machine according to claim 1, wherein the connecting-rod is divided into an upper portion situated above the second articulation, which upper portion carries the pin, and into a lower portion situated below the second articulation, which lower portion is articulated to the first jack.

8. A cutting machine according to claim 1, wherein the connecting-rod comprises an upper portion situated above the second articulation, which upper portion carries the pin, and is articulated to the first jack.

9. A cutting machine according to claim 5, wherein the pin is brought closer to the median plane by the second jack actuated to become shorter.

10. A cutting machine according to claim 1, wherein in at least one of the work and maneuver positions, the first jack, and the second jack overlap.

11. A cutting machine according to claim 1, wherein the first articulation has a pivoting axis situated in a vertical plane parallel to a direction of advance of the tractor.

12. A cutting machine according to claim 1, wherein the work element is moved between the work position and the maneuver position by at least one of the first and second jacks.

13. A cutting machine according to claim 12, wherein the work element is moved between the maneuver position and the transport position by at least one of the first and second jacks.

14. A cutting machine according to claim 12, wherein the work element is moved between the work position and the maneuver position by the first jack.

15. A cutting machine according to claim 13, wherein the work element is moved between the maneuver position and the transport position by the second jack.

16. A cutting machine according to claim 14, wherein the first jack is a single-acting jack.

17. A cutting machine according to claim 16, further comprising a control circuit of the first jack that comprises a fluid circulation system connecting the first jack, an accumulator and a lifting pump to each other and that the pressure in the fluid circulation system is adjustable.

18. A cutting machine according to claim 15, wherein the displacement device is configured so that in the transport position, the work element is substantially vertical, and that the second jack is a single-acting jack, in particular actuated to become shorter.

19. A cutting machine according to claim 15, wherein the displacement device is configured so that in the transport position, the work element is pivoted beyond a vertical position, and the second jack is a double-acting jack whereof an actuation to become shorter moves the work element toward the transport position and whereof an actuation to become elongated moves the work element from the transport position.

20. A cutting machine according to claim 1, further comprising a stop means provided on the chassis, and in the transport position, the upper portion of the connecting-rod bears on the stop means.

* * * * *